US012639825B2

(12) United States Patent
Cao et al.

(10) Patent No.: US 12,639,825 B2
(45) Date of Patent: May 26, 2026

(54) METHOD FOR DETECTING AND REMOVING PERSONNEL INTERFERENCE WHILE MEASURING VOLUME OF AN OBJECT

(71) Applicants: Mettler-Toledo (Changzhou) Measurement Technology Ltd., Changzhou (CN); Mettler-Toledo (Changzhou) Precision Instruments Ltd., Changzhou (CN); Mettler-Toledo International Trading (Shanghai) Co., Ltd., Shanghai (CN)

(72) Inventors: Conghan Cao, Changzhou (CN); Chao Fang, Changzhou (CN); Jindong Cui, Changzhou (CN); Shenhui Wang, Changzhou (CN); Song Zhang, Changzhou (CN); Hongqing Song, Changzhou (CN)

(73) Assignees: Mettler-Toledo (Changzhou) Measurement Technology Ltd., Changzhou (CN); Mettler-Toledo (Changzhou) Precision Instruments Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 306 days.

(21) Appl. No.: 18/561,898

(22) PCT Filed: May 9, 2022

(86) PCT No.: PCT/CN2022/091686
§ 371 (c)(1),
(2) Date: Nov. 17, 2023

(87) PCT Pub. No.: WO2022/242490
PCT Pub. Date: Nov. 24, 2022

(65) Prior Publication Data

US 2024/0233135 A1 Jul. 11, 2024

(30) Foreign Application Priority Data

May 17, 2021 (CN) ......................... 202110535180.3

(51) Int. Cl.
*G06T 7/13* (2017.01)
*G01B 11/02* (2006.01)
(Continued)

(52) U.S. Cl.
CPC ............ *G06T 7/194* (2017.01); *G01B 11/022* (2013.01); *G06T 7/12* (2017.01); *G06T 7/62* (2017.01); *G06T 2207/30196* (2013.01)

(58) Field of Classification Search
CPC .. G06T 7/194; G06T 7/12; G06T 7/62; G06T 2207/30196; G06T 7/13; G06T 2207/20036; G01B 11/022
See application file for complete search history.

(56) References Cited

U.S. PATENT DOCUMENTS 7,522,763 B2 * 4/2009 Tessadro .............. G06T 7/0004 382/199

FOREIGN PATENT DOCUMENTS

JP 2013011681 A * 1/2013

OTHER PUBLICATIONS

Jadhav, Volume Measurement of Object using Computer Vision, IEEE International Conference on Recent Trends in Electronics Information Communication Technology, May 20-21, 2016, India (Year: 2016).*

(Continued)

*Primary Examiner* — Vu Le
*Assistant Examiner* — Lei Zhao
(74) *Attorney, Agent, or Firm* — Standley Law Group LLP; Jeffrey S. Standley; Adam J. Smith

(57) ABSTRACT

These disclosures relate to a method for detecting and removing personnel interference while measuring volume of
(Continued)

an object. An image of an object is obtained, a background information of the image is removed, and the image is converted into a binary image. An outline of the object is detected from the binary image. A determination is made whether the outline extends towards a boundary of the field of view. If the outline of the object does not extend to the boundary of the field of view, the volume of the object is measured. Otherwise, an extending part is removed from the outline using a morphological method, if removable. If the extending part is removed, the volume of the object is measured based on an outline of the object obtained after the extended part is removed, and a class 1 warning is issued. Otherwise, a class 2 warning is issued and the measurement is ended. This approach improves efficiency of the object volume measurement.

10 Claims, 4 Drawing Sheets

(51) Int. Cl.

| | |
|---|---|
| ***G06T 7/12*** | (2017.01) |
| ***G06T 7/194*** | (2017.01) |
| ***G06T 7/62*** | (2017.01) |

(56) References Cited

OTHER PUBLICATIONS

Schmidtmann, Shape recognition: convexities, concavities and things in between, Scientific Reports 5, Article No. 17142 (2015) (Year: 2015).*

Kahatapitiya, Context-Aware Automatic Occlusion Removal, arXiv:1905.02710v1 [cs.CV] May 7, 2019 (Year: 2019).*

Jadhav, T. et al., Volume Measurement of Object using Computer Vision, IEEE International Conference on Recent Trends in Electronics Information Communication Technology, May 20-21, 2016, pp. 1792-1795, India.

Kahatapitiya, K. et al., Context-Aware Automatic Occlusion Removal, ResearchGate, URL https://www.researchgate.net/profile/Dumindu-Tissera/publication/332932341_Context-Aware_Automatic_Occlusion_Removal/links/5d3f157d4585153e592bc093/Context-Aware-Automatic-Occlusion-Removal.pdf, 5 pages, May 7, 2019.

* cited by examiner

METHOD FOR DETECTING AND REMOVING PERSONNEL INTERFERENCE WHILE MEASURING VOLUME OF AN OBJECT

TECHNICAL FIELD

The present invention relates to the field of object volume measurement technologies, and in particular, to a method for detecting and removing personnel interference while measuring volume of an object.

BACKGROUND ART

For measuring volume of an object, the object has to be carried by a personnel, and while capturing a picture of the object for volume measurement, the personnel might intervene in the field of view of the picture capturing device and an obtained image might have interference, and the object measurement data will be inaccurate.

In a conventional method, skin colour or pose of the personnel detected using deep learning are used to process the captured image and remove any interference present in the captured image. However, the processing time of these methods are longer and the method involves many steps to recognize and remove the personnel interference. In addition, a body part of a person handling the object can be captured in a picture, and other factors such as ambient light might affect skin colour and object colour, and the like. Therefore, it becomes difficult to detect, and it lead to false detection or missed detection.

SUMMARY OF INVENTION

In view of the foregoing problems in the prior art, the present invention discloses a method for detecting and removing personnel interference while measuring volume of an object, which can effectively improve efficiency of the object volume measurement.

Specifically, the present invention discloses the method for detecting and removing personnel interference while measuring volume of an object including the following steps:

- S1: obtaining an image of the object using a camera, removing a background information of the image, and converting the image into a binary image;
- S2: detecting an outline of the object from the binary image, and determining whether the outline of the object extends towards a boundary of a field of view of the camera; and if the outline of the object does not extend towards the boundary of the field of view, performing step S3 of measuring the volume of the object; else performing step S4 of removing an extending part from the outline of the object;
- S4: of removing the removing the extending part further comprises using a morphological method if the extending part from the outline of the object is removable, then performing step S5;
- S5: measuring the volume of the object based on an outline of the object obtained after the extended part is removed, and issuing a class 1 warning.

According to an embodiment of the present invention, in step S2, the outline of the object is detected, the outline of the object is compared with the boundary of the field of view, and whether the outline of the object extends towards the boundary of the field of view is determined.

According to an embodiment of the present invention, in step S3, it is determined whether the outline of the object is extending or not, before measuring the volume of the object.

According to an embodiment of the present invention, whether the outline of the object is extending or not is determined based on convex and concave characteristics of the outline of the object.

According to an embodiment of the present invention, in step S4, if the extended part is not removable then performing step S6 of issuing a class 2 warning and then performing step S7 of ending the measurement.

According to an embodiment of the present invention, class 1 warning in step S5 is to deliver a warning regarding personnel intervention.

According to an embodiment of the present invention, class 2 warning in step S6 is to deliver a warning regarding personnel intervention and/or that the object extends beyond the boundary of the field of view.

The method for detecting and removing personnel interference while measuring volume of an object is provided in the present invention which can effectively remove interference of hands and other interfering limb parts of the personnel assisting in the process of volume measurement, by locating, selecting and removing an interference part based on a degree of interference, to obtain a correct measurement result, thereby effectively improving efficiency of measuring object volume.

It should be understood that the above general description and the following detailed description of the present invention are both exemplary and illustrative, and are intended to provide further explanations for the present invention.

BRIEF DESCRIPTION OF DRAWINGS

The accompanying drawings are included to provide a further understanding of the present invention that are incorporated in and constitute a part of the present application. The drawings show the various embodiments of the present invention, and serve together with the description, for describing the principles of the present invention in detail.

FIG. 2-1 shows an image of an object FIG. 2-2 shows a result obtained after removing a background information of the image FIG. 2-1 and converting the image FIG. 2-1 into a binary image FIG. 3-1 shows a binary image of an object with personnel interference FIG. 3-2 shows a result obtained after an extended part of an outline of an object shown in FIG. 3-1 is removed

DESCRIPTION OF EMBODIMENTS

Figure 1:
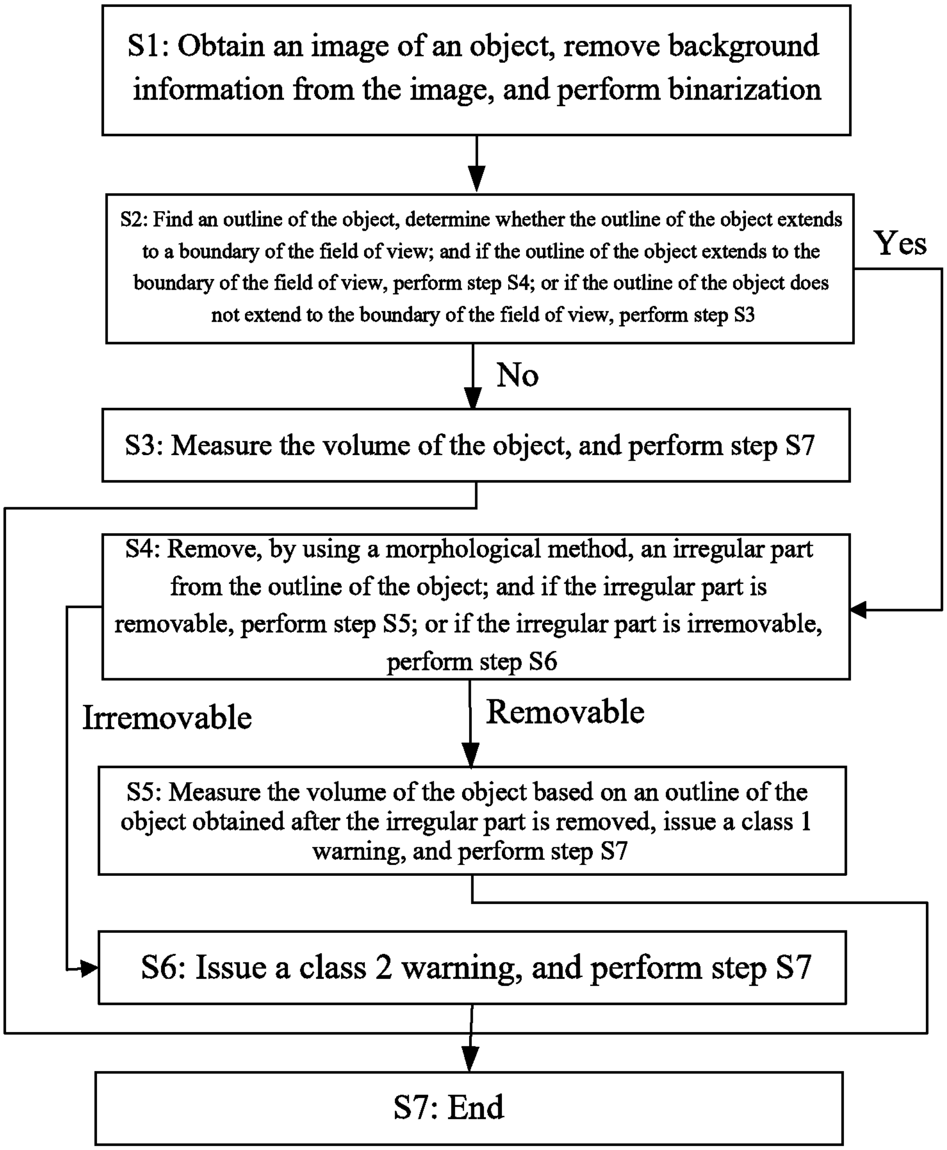
FIG. 1 shows a flowchart of a method for detecting and removal of personnel interference while measuring volume of an object according to an embodiment of the present invention

It should be noted that, in case of no conflict, the embodiments and the features thereof in the present application can be combined with each other.

The technical solution disclosed in the embodiments of the present application will be clearly and completely described below in conjunction with the drawings in the embodiments of the present application. Apparently, the described embodiments are merely some rather than all of the possible embodiments of the present application. The following description of at least one exemplary embodiment is merely illustrative, and in no way serves as any limitation on the present application and application or use thereof. All other embodiments derived by those of skilled in the art based on the embodiments of the present application without creative efforts fall within the protection scope of the present application.

It should be noted that the terms used herein are merely for describing specific implementations, and are not intended to limit the exemplary implementations according to the present application. As used herein, unless the context clearly indicates otherwise, the singular forms are intended to include the plural forms as well. Moreover, it should also be understood that when the terms “include(s)” and/or “comprise(s)” are used in the description, it indicates the presence of features, steps, operations, devices, components, and/or combinations thereof.

Unless specifically stated otherwise, the relative arrangement of components and steps, numerical expressions and numerical values set forth in these embodiments do not limit the scope of the present application. In addition, it should be understood that, for ease of description, the sizes of various parts shown in the drawings are not drawn to scale. The technologies, methods, and devices known to those of ordinary skill in the related art may not be discussed in detail, but where appropriate, the technologies, methods, and devices should be regarded as part of the authorization specification. In all examples shown and discussed here, any specific value should be interpreted as merely exemplary and not as limiting. Therefore, other examples of the exemplary embodiment may have different values. It should be noted that similar reference signs and letters refer to similar items in the following drawings. Therefore, once a specific item is defined in one of the drawings, it need not be further discussed in subsequent drawings.

In the description of the present application, it should be understood that, an orientation or position relationship indicated by orientation terms such as “front, rear, upper, lower, left, and right” “transverse, longitudinal, vertical, and horizontal”, and “top and bottom” is usually based on an orientation or position relationship shown in the drawings, which is only for the convenience of describing the present application and simplifying the description. Unless otherwise stated, these orientation terms do not indicate or imply that an apparatus or element referred to must have a specific orientation or be constructed and operated in a specific orientation, so that the orientation terms cannot be understood as a limitation of the protection scope of the present application; and the orientation terms “inner and outer” refer to the inside and outside relative to the contour of each component itself.

For convenience of description, spatially relative terms such as “on”, “above”, “on the top surface”, “upper”, etc. can be used herein to describe a spatial position relationship between a device or a feature shown in the figure and other devices or features. It should be understood that spatially relative terms are intended to include different orientations in use or operation in addition to the orientation of the device described in the figure. For example, if the device in the figure is inverted, the device described as “on other devices or structures” or “above other devices or structures” will then be positioned as “under other devices or structures” or “below other devices or structures”. Therefore, the exemplary term “above” may comprise two orientations “above” and “below”. The device may also be positioned in other different manners (rotated by 90 degrees or in other orientations), and spatially relative description used here is explained accordingly.

In addition, it should be noted that the use of words such as “first” and “second” to define parts is merely for the convenience of distinguishing between corresponding parts. Unless otherwise stated, the above words have no special meaning and therefore cannot be understood as limitation of the protection scope of the present application. Furthermore, although the terms used in the present application are selected from well-known common terms, some of the terms mentioned in the specification of the present application may have been selected by the applicant according to his or her determination, and the detailed meaning thereof is described in the relevant section described herein. Furthermore, the present application must be understood, not simply by the actual terms used but also by the meanings encompassed by each term.

FIG. 1 shows a flowchart of a method for detecting and removing personnel interference while measuring volume of an object according to an embodiment of the present invention. As shown in the figure, the method includes the steps as follows:

S1: Obtain an image of an object using a camera, remove a background information of the image, and convert the obtained image into a binary image.

S2: Detect an outline of the object from the binary image, and determine whether the outline of the object extends to a boundary of the field of view.

If the outline of the object does not extend towards the boundary of the field of view, perform step S3 to measure the volume of the object; else perform step S4 of removing an extending part from the outline of the object.

Then, perform step S5 to measure volume of the object based on the outline of the object which is obtained after removing the extended part, and issuing a class 1 warning.

Generally, the boundary of the field of view refers to a boundary of the entire image containing the object.

Preferably, in step S2, the outline of the object is detected, and the outline of the object is compared with the boundary of the field of view, to determine whether the outline of the object is extending towards the boundary of the field of view.

Preferably, in step S3, it is determined whether the outline of the object is extending or not, before measuring the volume of the object. It is understandable that, step S3 can be performed only when there is no personnel interference and the outline of the object does not extend and connect to the boundary of the field of view. If the object has a regular outline, for example, the outline of the object is rectangle, subsequent measurement work becomes easier. More preferably, whether the outline of the object is rectangle is determined based on the similarity between rectangle and the fitting figure of the outline of the object.

Conventionally, if there is no personnel interference, volume measurement for the object is completed by performing step S1, S2 and S3, and no additional calculation is required. A calculation amount of the remaining steps is extremely small, and is less than 1% of a calculation amount of total measurement. Therefore, the method for detecting and removing personnel interference while measuring volume of the object is provided in the present invention which can effectively improve efficiency of object volume measurement, with only small increase in workload.

Preferable, step S4 of removing the extended part from the outline of the object is performed by using a morphological method.

Preferably, in step S4, if the extended part is not removable then step S6 is performed by issuing a class 3 warning and then perform step S7 of ending the measurement.

Preferably, the class 1 warning in step S5 is to deliver a warning regarding personnel intervention. A system may consider to obtain a picture of the object again after interference is removed.

Preferably, the class 2 warning in step S6 is to deliver a warning regarding personnel intervention and/or that the object outline is extending beyond the boundary of the field of view. A system needs to obtain a picture of the object again after interference is removed or then the object is correctly placed.

Embodiment 1

Figures 1, 2:
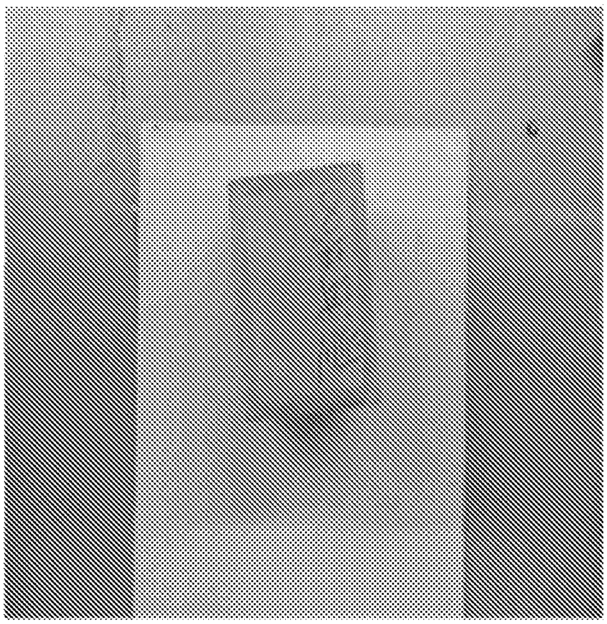
Figure 2:
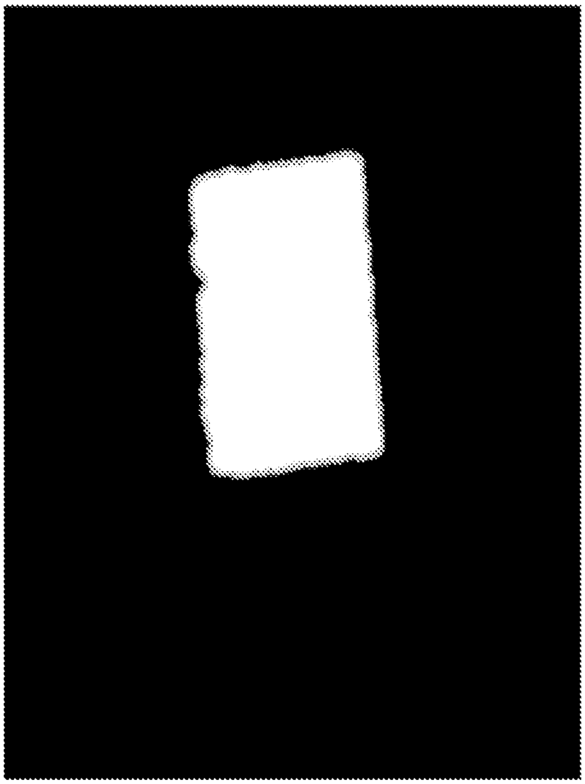

This Embodiment Discloses a Process of Measuring the Volume of the Object with No Personnel Interference FIG. 2-1 shows an image of an object obtained by capturing using a camera. FIG. 2-2 shows a result obtained after the background information is removed from the image and after converting the image obtained to a binary image. As shown in the figures, a method for detecting and removing personnel interference while measuring the volume of an object is provided in the present invention.

S1: Obtain an image of an object. Reference is made to FIG. 2-1. Background information is removed from the image, and the image is converted into a binary image. This process gives the entire image a distinctive black and white effect. After the conversion into binary image is completed, the images as shown in FIG. 2-2 is obtained.

S2: Find an outline of the object, and determine whether the outline of the object extends towards a boundary of the field of view. As shown in FIG. 2-2, the outline of the object is an outer edge of a white image, and the boundary of the field of view is an outer edge of a black region. Apparently, if the outline of the object is not in contact with the boundary of the field of view, step S3 is performed.

S3: Measure the volume of the object.

Embodiment 2

Figures 1, 3:
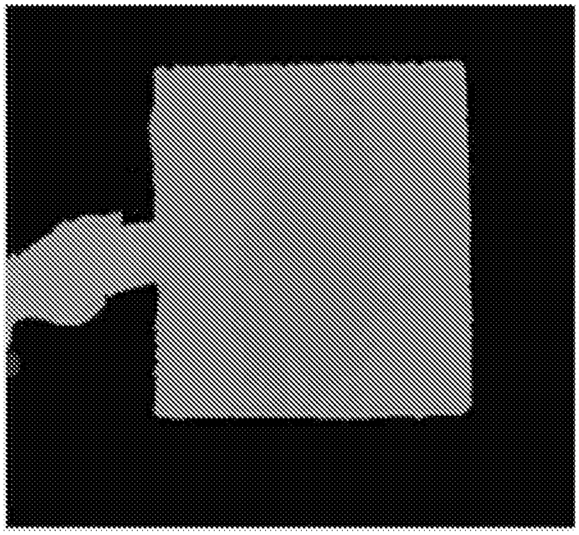
Figures 2, 3:
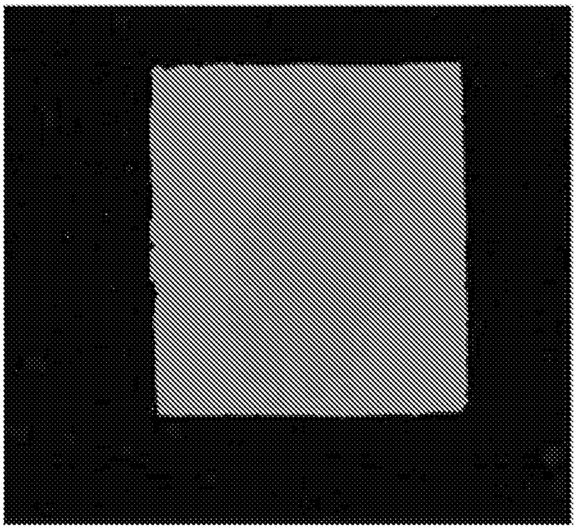

FIG. 3-1 shows a binary image of an object with personnel interference.

FIG. 3-2 shows a result obtained after an extended part of an outline of an object shown in FIG. 3-1 is removed; and as shown in the FIG. 3-2, a method for detecting and removing personnel interference while measuring volume of an object provided in the present invention is performed.

S1: Obtain an image of an object, remove a background information of the image, and convert the image into a binary image. Reference is made to FIG. 3-1.

S2: Detect an outline of the object, and determine whether the outline of the object extends towards a boundary of the field of view. In FIG. 3-1, the outline of the object is an outer edge of a grey image in the middle, and the boundary of the field of view is an outer edge of a black region. Apparently, if the outline of the binary image of the object intersects with the boundary of the field of view, then step S4 is performed.

S4: Remove an extended part from the outline of the object by using a morphological method. Referring to FIG. 3-2, after the extended part has been removed from the outline of the object, then step S5 is performed.

S5: Measure the volume of the object based on an outline of the object obtained after the irregular part is removed. A class 1 warning is issued, to deliver a warning that there is personnel intervention (interference).

Embodiment 3

In Embodiment 3, a measurement result cannot be obtained, and an image of the object needs to be obtained again after personnel interference is removed or after a position of the object is adjusted.

Figure 4:
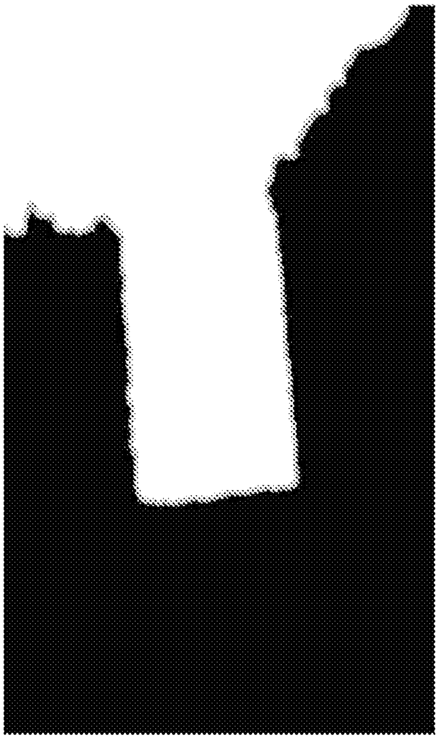
FIG. 4 shows a binary image of an object with interference

FIG. 4 shows a binary image of an object with interference. As shown in the figure, a method for detecting and removing personnel interference while measuring volume of an object is provided in the present invention.

S1: Obtain an image of an object, remove a background information of the image, and convert the image into a binary image. Reference is made to FIG. 4.

S2: Detect an outline of the object, and determine whether the outline of the object extends towards a boundary of the field of view. In FIG. 4, the outline of the object is an outer edge of a grey image in the middle, and the boundary of the field of view is an outer edge of a black region. Apparently, if the outline of the object intersects with the boundary of the field of view, then step S4 is performed.

S4: If an extending part cannot be removed from the outline of the object by using a morphological method, then step S6 is performed.

S6: Issue a class 2 warning, to deliver a warning regarding a personnel intervention and/or that the object extends beyond the boundary of the field of view, and step S7 is performed.

S7: End of the measurement.

The anti-personnel-interference object volume measurement method provided in the present invention can effectively detect interference of hands and other limb parts of measurement assisting personnel in the process of volume measurement, locate an interference region, and perform determination based on a degree of interference.

When the object to be measured is not severely blocked, an interference region thereof can be removed, and a correct measurement result can be obtained. Alternatively, when the object to be measured is severely blocked or incorrectly placed, a system is warned to capture a picture of the object again.

It can be apparent for a person skilled in the art that various modifications and variations may be made to the exemplary embodiments of the present invention without departing from the spirit and scope of the present invention. Therefore, it is intended that the present invention covers the modifications and variations of the present invention that fall within the scope of the appended claims and their equivalents.

The invention claimed is:

1. A method for detecting and removing personnel interference while measuring a volume of an object, said method comprising:

obtaining an image of the object using a camera, removing background information of the image, and converting the obtained image into a binary image;

detecting an outline of the object from the binary image, and determining whether the outline of the object extends towards a boundary of a field of view of the camera;

if the outline of the object does not extend towards the boundary of the field of view, measuring the volume of the object;

if the outline of the object extends towards the boundary of the field of view:

determining an extending part that is defined by a part of the outline of the object that extends towards the boundary of the field of view:

removing the extending part from the object shown in the binary image;

measuring the volume of the object based on the outline of the object obtained after the extended part is removed; and issuing a class 1 warning.

2. The method according to claim 1, wherein the boundary of the field of view is an outer edge of a black region.

3. The method according to claim 1, wherein detecting the outline of the object from the binary image, and determining whether the outline of the object extends towards the boundary of the field of view of the camera, the outline of the object is detected, and the outline of the object is compared with the boundary of the field of view to determine whether the outline of the object is extending towards the boundary of the field of view.

4. The method according to claim 1, wherein, the determination of whether the outline of the object extends towards the boundary of the field of view of the camera or not, occurs before measuring the volume of the object.

5. The method according to claim 4, wherein the determination of whether the outline of the object extends towards the boundary of the field of view of the camera or not is based on convex and concave characteristics of the outline of the object.

6. The method according to claim 1, wherein a morphological method is used for removing the extending part from the outline of the object.

7. The method according to claim 1, further comprising:

determining whether the extended part is not removable; and if the extended part is not removable, issuing a class 2 warning and ending the measurement.

8. The method according to claim 7, wherein the class 2 warning comprises delivering a warning regarding personnel intervention and/or that the object outline is extending beyond the boundary of the field of view.

9. The method according to claim 1, wherein the class 1 warning comprises delivering a warning regarding personnel intervention.

10. A method for detecting and removing personnel interference while measuring a volume of objects, said method comprising:

obtaining images of objects using a camera, removing background information of the images, and converting the obtained images into binary images;

detecting outlines of the objects from the binary images, and determining whether the outlines of the objects extend towards a boundary of a field of view of the camera;

determining that the outline of a first one of the objects does not extend towards the boundary of the field of view, and measuring the volume of this first one of the objects; and determining that the outline of a second one of the objects extends towards the boundary of the field of view, and:

determining an extending part that is defined by a part of the outline of this second one of the objects that extends towards the boundary of the field of view:

removing the extending part from the outline of this second one of the objects shown in the binary images;

measuring the volume of this second one of the objects based on the outline of the second one of the objects obtained after the extended part is removed; and issuing a class 1 warning.

* * * * *